US006740397B1

United States Patent
Lee

(10) Patent No.: US 6,740,397 B1
(45) Date of Patent: May 25, 2004

(54) SUBSEEDLAYERS FOR MAGNETIC RECORDING MEDIA

(75) Inventor: Li-Lien Lee, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 36 days.

(21) Appl. No.: 09/847,434

(22) Filed: May 3, 2001

Related U.S. Application Data
(60) Provisional application No. 60/206,867, filed on May 24, 2000.

(51) Int. Cl.[7] .............................. G11B 5/62; H01F 1/03; H01F 1/04; H01F 10/30
(52) U.S. Cl. .................. 428/332; 428/336; 428/694 T; 428/694 TS
(58) Field of Search ................. 429/332, 336, 429/394 T, 694 TS

(56) References Cited

U.S. PATENT DOCUMENTS

| | | |
|---|---|---|
| 4,828,905 A | 5/1989 | Wada et al. |
| 5,496,606 A | 3/1996 | Mizukami |
| 5,650,889 A | 7/1997 | Yamamoto et al. |
| 5,693,426 A * | 12/1997 | Lee et al. .................. 428/611 |
| 5,700,593 A | 12/1997 | Okumura et al. |
| 5,733,370 A | 3/1998 | Chen et al. |
| 5,789,056 A | 8/1998 | Bian et al. |
| 5,789,090 A | 8/1998 | Okumura et al. |
| 5,800,931 A | 9/1998 | Lee et al. |
| 5,846,648 A * | 12/1998 | Chen et al. .................. 428/332 |
| 5,858,566 A | 1/1999 | Zhang |
| 5,980,997 A * | 11/1999 | Ross et al. .................. 427/555 |
| 5,993,956 A * | 11/1999 | Lambeth et al. ............ 428/332 |
| 6,010,795 A | 1/2000 | Chen et al. |
| 6,077,586 A | 6/2000 | Bian et al. |
| 6,139,951 A * | 10/2000 | Chen et al. .................. 428/332 |
| 6,139,981 A | 10/2000 | Chuang et al. |
| 6,143,388 A | 11/2000 | Bian et al. |
| 6,150,015 A * | 11/2000 | Bertero et al. ............... 428/332 |
| 6,309,765 B1 * | 10/2001 | Suekane et al. ........ 428/694 TS |
| 6,346,339 B1 * | 2/2002 | Harkness et al. ...... 428/694 TS |

FOREIGN PATENT DOCUMENTS

| | | |
|---|---|---|
| JP | 59178625 | 10/1984 |
| JP | 5109039 | 4/1993 |

OTHER PUBLICATIONS

"Effects of Cr Intermediate Layers on CoCrPT Thin Film Media on NiAl underlayers," Li–Lien et al. IEEE Transactions on Magnetics, vol. 31, No. 6, Nov. 1995, pp. 2728–2730.*

"Magnetic Properties and Noise Characteristics of High Coercivity CoCrPTB/Cr Media," Paik et al. IEEE Transactions on Magnetics, vol. 28, #5, Sep. 1992, pp. 3084–3086.*

H. Kataoka et al., "Magnetic and recording characteristics of Cr, Ta, W and Zr pre–coated glass disks", IEEE Transactions on Magnetics, vol. 31, No. 6, pp. 2734–2736, Nov. 1995.

L. Lee et al., "Seed layer induced (002) crystallographic texture in NiAl underlayers", J. Appl. Phys. 79 (8), pp 4902–4904, Apr. 15, 1996.

L. Lee et al., "FeAl underlayers for CoCrPt thin film longitudinal media", J. Appl. Phys. 81 (8), pp. 4366–4368, Apr. 15, 1997.

* cited by examiner

Primary Examiner—Paul Thibodeau
Assistant Examiner—Nicholas J Uhlir
(74) Attorney, Agent, or Firm—Morrison & Foerster LLP

(57) ABSTRACT

A magnetic recording medium on glass or Al substrates with a film structure of subseedlayer/seedlayer/underlayer/magnetic layer/carbon overcoat, in this order, in which the subseedlayer comprises an element of Group VIb and the seedlayer comprises a material having a B2 structure.

29 Claims, 11 Drawing Sheets

← Protective overcoat 23

← Magnetic layer 22

← Underlayer 21

← Substrate 20

← Underlayer 21'

← Magnetic layer 22'

← Protective overcoat 23'

← Protective layer 35

← Magnetic layer 34

← Underlayer 33

← Seedlayer 32

← Subseedlayer 31

← Substrate 30

← Subseedlayer 31'

← Seedlayer 32'

← Underlayer 33'

← Magnetic layer 34'

← Protective layer 35'

SUBSEEDLAYERS FOR MAGNETIC RECORDING MEDIA

RELATED APPLICATIONS

This application claims priority from Provisional Application Serial No. 60/206,867 filed May 24, 2000, entitled "Subseedlayers for Magnetic Recording Media," the entire disclosure of which is hereby incorporated herein by reference. This application is also related to U.S. Pat. No. 5,800,931, the entire disclosure of which is hereby incorporated herein by reference.

FIELD OF INVENTION

This invention relates to magnetic recording media, such as thin film magnetic recording disks, and to a method of manufacturing the media. The invention has particular applicability to high areal density magnetic recording media having thin films for longitudinal magnetic recording media, and more particularly, to B2-structured underlayers for use with a cobalt or cobalt alloy based magnetic layer.

BACKGROUND

The increasing demands for higher areal recording density impose increasingly greater demands on thin film magnetic recording media in terms of remanent coercivity (Hr), magnetic remanance (Mr), coercivity squareness (S*), medium noise, i.e., signal-to-medium noise ratio (SMNR), and narrow track recording performance. It is extremely difficult to produce a magnetic recording medium satisfying such demanding requirements.

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. The rotary actuator could have several suspensions and multiple magnetic heads to allow for simultaneous recording and reproduction on and from both surfaces of each medium.

An electromagnetic converting portion (not shown) for recording/reproducing information is mounted on the magnetic head 13. The arm 15 has a bobbin portion for holding a driving coil (not shown). A voice coil motor 19 as a kind of linear motor is provided to the other end of the arm 15. The voice motor 19 has the driving coil wound on the bobbin portion of the arm 15 and a magnetic circuit (not shown). The magnetic circuit comprises a permanent magnet and a counter yoke. The magnetic circuit opposes the driving coil to sandwich it. The arm 15 is swingably supported by ball bearings (not shown) provided at the upper and lower portions of a pivot portion 17. The ball bearings provided around the pivot portion 17 are held by a carriage portion (not shown).

A magnetic head support mechanism is controlled by a positioning servo driving system. The positioning servo driving system comprises a feedback control circuit having a head position detection sensor (not shown), a power supply (not shown), and a controller (not shown). When a signal is supplied from the controller to the respective power supplies based on the detection result of the position of the magnetic head 13, the driving coil of the voice coil motor 19 and the piezoelectric element (not shown) of the head portion are driven.

A cross sectional view of a conventional longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-alloy, a magnetic layer 22, 22', typically comprising a cobalt (Co)-base alloy, and a protective overcoat 23, 23', typically containing carbon. Conventional practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-alloy underlayer.

According to the domain theory, a magnetic material is composed of a number of submicroscopic regions called domains. Each domain contains parallel atomic moments and is always magnetized to saturation, but the directions of magnetization of different domains are not necessarily parallel. In the absence of an applied magnetic field, adjacent domains may be oriented randomly in any number of several directions, called the directions of easy magnetization, which depend on the geometry of the crystal. The resultant effect of all these various directions of magnetization may be zero, as is the case with an unmagnetized specimen. When a magnetic field is applied, the domains most nearly parallel to the direction of the applied field grow in size at the expense of the others. This is called boundary displacement of the domains or the domain growth. A further increase in magnetic field causes more domains to rotate and align parallel to the applied field. When the material reaches the point of saturation magnetization, no further domain growth would take place on increasing the strength of the magnetic field.

A magnetic material is said to possess a uniaxial anisotropy when all domains are oriented in the same direction in the material. On the other extreme, a magnetic material is said to be isotropic when all domains are oriented randomly.

Important magnetic properties, such as coercivity (Hc), remanent magnetization (Mr) and coercive squareness (S*), which are crucial to the recording performance of the Co alloy thin film for a fixed composition, depend primarily on its microstructure. For thin film longitudinal magnetic recording media, the desired crystalline structure of the Co and Co alloys is hexagonal close packed (HCP) with uniaxial crystalline anisotropy and a magnetization easy direction along the c-axis is in the plane of the film. The better the in-plane c-axis crystallographic texture, the higher the coercivity of the Co alloy thin film used for longitudinal recording. This is required to achieve a high remanence. For very small grain sizes coercivity increases with increased grain size. Large grains, however, result in greater noise. There is a need to achieve high coercivities without the increase in noise associated with large grains. To achieve a low noise magnetic medium, the Co alloy thin film should have uniform small grains with grain boundaries which can magnetically isolate neighboring grains. This kind of microstructure and crystallographic texture is normally achieved by manipulating the deposition process, by grooving the substrate surface, or most often by the proper use of an underlayer.

The linear recording density can be increased by increasing the Hr of the magnetic recording medium, and by decreasing the medium noise, as by maintaining very fine magnetically non-coupled grains. Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

Underlayers can strongly influence the crystallographic orientation, the grain size and chemical segregation at the Co alloy grain boundaries. Underlayers that have been reported in the literature include Cr, Cr with an additional alloy element X (X=C, Mg, Al, Si, Ti, V, Co, Ni, Cu, Zr, Nb, Mo, La, Ce, Nd, Gd, Th, Dy, Er, Ta, and W), Ti, W, Mo, and NiP. While there would appear to be a number of underlayer materials available, in practice, only a very few work well enough to meet the demands of the industry. Among them, the most often used and the most successful underlayer is pure Cr. For high density recording, in-plane orientation has heretofore been achieved by grain-to-grain epitaxial growth of the HCP Co alloy thin film on a body centered cubic (BCC) Cr underlayer. The polycrystalline Co-based alloy thin film is deposited with its c-axis, the 0002 axis, either parallel to the film plane or with a large component of the c-axis in the film plane. Different Co/Cr epitaxial relationships prevail for different deposition processes. To obtain a good BCC structure which promotes the formation of the HCP structure, the Cr underlayer must be thicker than about 100Å. U.S. Pat. No. 4,652,499 discloses efforts to improve the underlayer by adding vanadium (V) to Cr to change its lattice constant and thereby to promote a better lattice matching between the HCP Co alloys, CoPt or CoPtCr, and the BCC CrV underlayer.

Furthermore, there exists a texture relationship between the underlayer and the magnetic layer. Therefore, the influence of the seedlayer in terms of a texture relationship permeates even into the magnetic layer.

Conventional Cr-alloy underlayers comprise chromium (Cr), vanadium (V), titanium (Ti), tungsten (W) or molybdenum (Mo). Conventional magnetic layers are CoCrTa, CoCrPtB, CoCrPt, CoCrPtTaNb and CoNiCr.

A conventional longitudinal recording disk medium is prepared by depositing multiple layers of metal films to make a composite film. In sequential order, the multiple layer typically comprises a non-magnetic substrate, one or more underlayers, a magnetic layer, and a protective carbon layer. Generally, a polycrystalline epitaxially grown cobalt-chromium (CoCr) alloy magnetic layer is deposited on a chromium or chromium-alloy underlayer.

Conventional methods for manufacturing a longitudinal magnetic recording medium with a glass, glass-ceramic, Al or Al—NiP substrate comprise applying a seedlayer between the substrate and underlayer. A conventional seedlayer seeds the nucleation of a particular crystallographic texture of the underlayer. Conventionally, a seedlayer is the first deposited layer on the non-magnetic substrate. The role of this layer is to texture (alignment) the crystallographic orientation of the subsequent Cr-containing underlayer.

The seedlayer, underlayer, and magnetic layer are conventionally sequentially sputter deposited on the substrate in an inert gas atmosphere, such as an atmosphere of argon. A conventional carbon overcoat is typically deposited in argon with nitrogen, hydrogen or ethylene. Conventional lubricant topcoats are typically about 20Å thick.

It is recognized that the magnetic properties, such as Hr, Mr, S* and SMNR, which are critical to the performance of a magnetic alloy film, depend primarily upon the microstructure of the magnetic layer which, in turn, is influenced by one or more underlying layers on which it is deposited.

In co-pending U.S. patent application Ser. No. 09/152,326 filed on Sep. 14, 1998, a magnetic recording medium is disclosed comprising a surface oxidized NiAl seedlayer, and sequentially deposited thereon a Cr-containing underlayer, a CoCrTa intermediate layer and a CoCrPtTa magnetic layer. "Seedlayer Induced (002) Crystallographic Texture in NiAl Underlayers," L.-L. Lee, D. E. Laughlin and D. N. Lambeth, *J. AppL. Phys.*, 79 (8), pp. 4902–4904 (1996), discloses a MgO seedlayer. "FeAl Underlayers for CoCrPt Thin Film Media," L.-L. Lee, D. E. Laughlin and D. N. Lambeth, *J. AppL. Phys.*, 81 (8), pp. 4366–4368 (1997), first reported an FeAl underlayer having a B2 structure.

In order to squeeze as much digital information as possible on a recording disc medium there is a continuing need for improved areal density magnetic recording media exhibiting high coercivity and high SMNR. The need for lighter, smaller and better performing computers with greater storage density demands higher density hard disk media. It is an object of the present invention to meet those demands with a longitudinal magnetic recording media having high coercivity and low noise.

SUMMARY OF THE INVENTION

The invention provides a magnetic recording medium for high areal recording density exhibiting low noise, high coercivity. One way of achieving this goal is to produce a magnetic recording medium having a subseedlayer that could alter the structure of the surface upon which a seedlayer is deposited. Preferably, the seedlayer should then be capable of inducing the c axis of a hexagonal crystalline phase (HCP) of a layer above the seedlayer to line predominantly parallel to the magnetic film of the media. The magnetic recording medium of the invention could comprise a substrate, a subseedlayer comprising a Group VIb element, a seedlayer comprised of a material having a B2-ordered crystalline structure, and a magnetic layer preferably formed from a Co or Co alloy film. The substrate could be a disk or a tape.

An underlayer could also be provided, which could comprise of a material having either an A2 structure or a B2-ordered crystalline structure disposed between the seedlayer and the magnetic layer. The A2 phase is preferably Cr or a Cr alloy, such as CrV. The B2 phase is selected from the group consisting of NiAl, AlCo, FeAl, FeTi, CoFe, CoTi, CoHf, CoZr, NiTi, CuBe, CuZn, AlMn, AlRe, AgMg, and $Al_2FeMn_2$, and is most preferably FeAl or NiAl.

An embodiment of this invention is a magnetic recording medium, comprising a substrate, a subseedlayer comprising a Group VIb element, a seedlayer comprising a material comprising a B2 structure, and a magnetic layer, in this order. The subseedlayer could further comprise a Group Vb element. The seedlayer could further comprise a (112) laminar texture. In the magnetic recording medium of this invention, a portion of the seedlayer could be oxidized and the medium could further comprise an underlayer comprising a Cr-containing material. The oxidized portion of the seedlayer could contain from about 0.0001 atomic percent oxygen to about 20 atomic percent oxygen, preferably, from about 0.01 atomic percent oxygen to about 0.9 atomic percent oxygen. The oxidized portion of the seedlayer could have a mean grain size diameter of 10 nm or less. In a preferred embodiment, the subseedlayer could be amorphous. The magnetic recording medium could further comprise an intermediate layer interposed between the magnetic layer and the underlayer. In another preferred embodiment, the subseedlayer could be between about 1 nm to 50 nm thick and it could comprise Ta and W or Ni and W; the seedlayer could comprise Ni and Al.

Another embodiment of this invention is a method of manufacturing a magnetic recording medium, comprising depositing a subseedlayer on a substrate; depositing a seedlayer on the subseedlayer and depositing a magnetic layer on the seedlayer, wherein the subseedlayer comprises a Group VIb element and the seedlayer comprises a material comprising a B2 structure.

Another embodiment of this invention is a magnetic recording medium, comprising a seedlayer comprising a material comprising a B2 structure and means for improving a (112) laminar texture of the seedlayer. In this invention, means for improving a (112) laminar texture of the seedlayer is a layer such as a subseedlayer.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
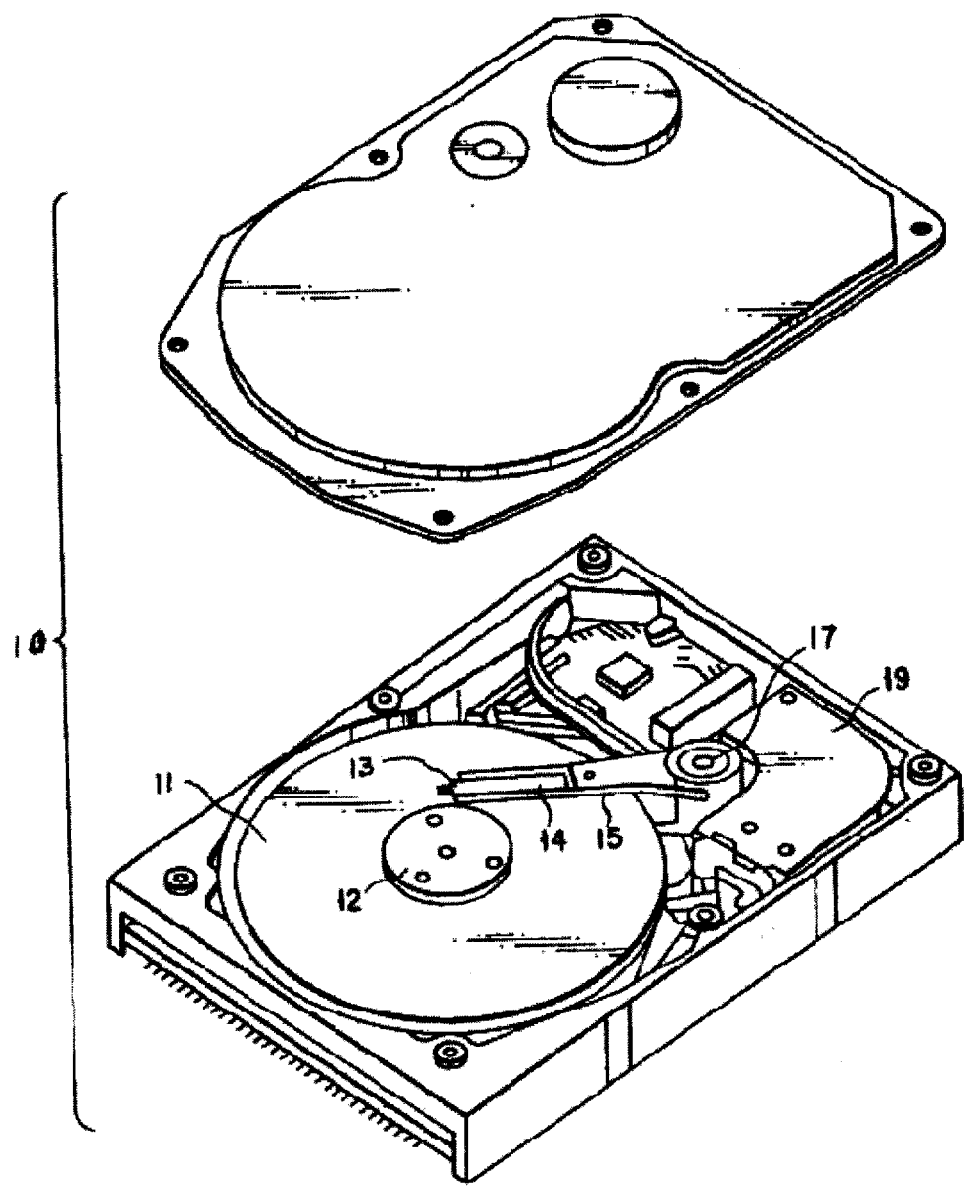
FIG. 1 is a view of a magnetic disk drive.
Figure 2:
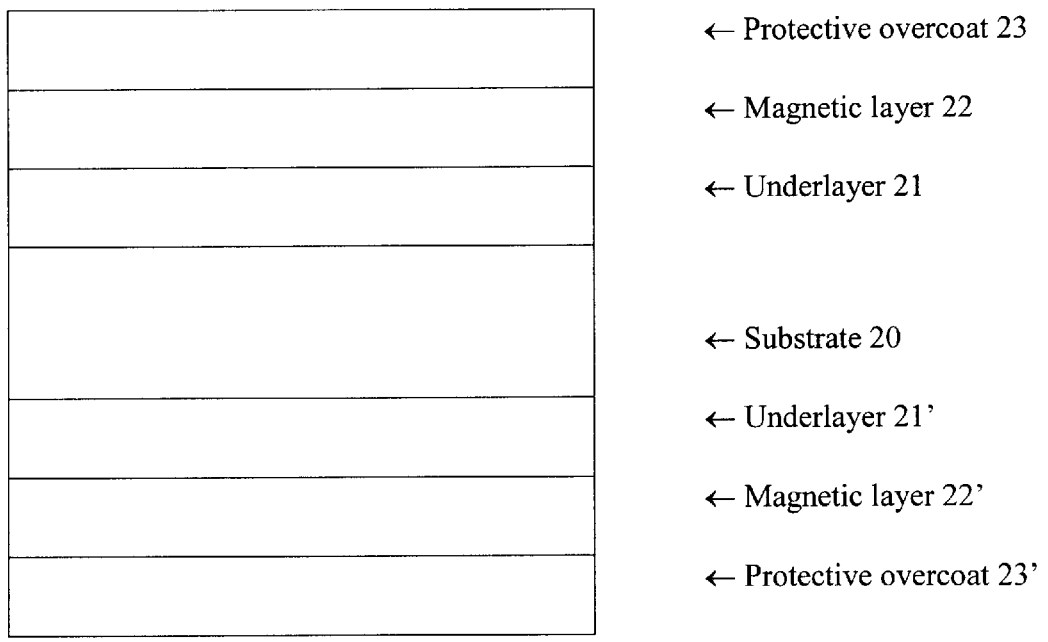
FIG. 2 is a schematic representation of the film structure in accordance with a magnetic recording medium of the prior art.

The recording media of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs or tapes using known flexible substrates.

This invention provides magnetic recording media suitable for high areal recording density exhibiting high coercivity and high SMNR. This invention achieves such technological advantages by providing a subseedlayer below the seedlayer, over which an underlayer could be deposited.

Figure 3:
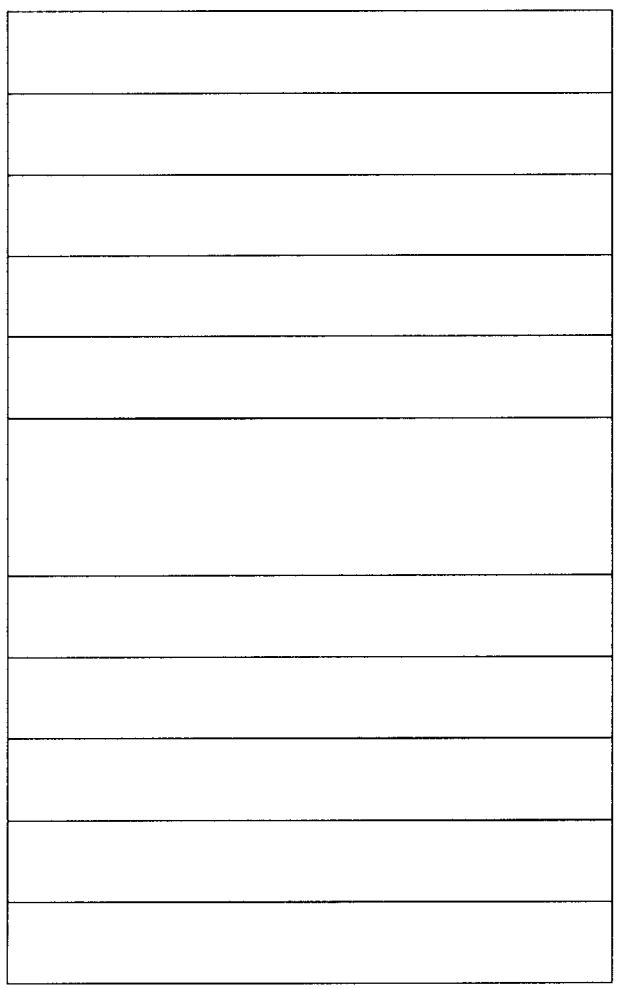
FIG. 3 is a schematic representation of the film structure in accordance with an embodiment of this invention.

In one embodiment of this invention, the sequential stacking arrangement of the layers on the substrate is as shown in FIG. 3. FIG. 3 shows a non-magnetic substrate 30 having sequentially deposited on each side thereof a W, NbW or TaW subseedlayer 31, 31', a NiAl or oxidized NiAl (NiAlOx) seedlayer 32, 32', a CrRuW underlayer 33, 33', a CoCrPtB magnetic layer 34, 34', and a protective overcoat 35, 35', typically containing carbon. One possible role of the underlayer is to improve the crystallinity of the subsequent interface with the intermediate layer as well as to more closely assimilate the lattice parameters of the adjacent layers.

In one embodiment, a portion of the subseedlayer, the seedlayer and/or the underlayer could be oxidized by being sputter deposited with Ar and oxygen to promote a decrease in grain size. The term "a portion of" is defined herein to include all or part of a layer. Therefore, the entire layer, i.e., extending from one end of the layer to the opposite end of the layer may be in the oxidized form.

In an alternative arrangement, there may be first and second magnetic layers, and one or more interlayers disposed between the first magnetic layer and a second magnetic layer. The interlayer is preferably made of a non-magnetic body-centered cubic (BCC) material such as Cr and Cr alloy or a non-magnetic HCP material such as Ru and CoCrX, where X is B, Pt, Ru, Ta, Ti and Mo, and is about 0.1 nm to about 4 nm thick. The second magnetic layer could be covered by an overlayer, an overcoat, and an organic lubricant. A seedlayer of about 1.0 nm to 50 nm thick may be disposed between the substrate and the underlayer to nucleate growth.

In another preferred embodiment of the recording media, the seedlayer is a B2-ordered crystalline structure with a (112) or (002) laminar texture sputter deposited on the subseedlayer, which is deposited on the substrate. The seedlayer of this embodiment could contain MgO that could result in a (002) laminar texture of the seedlayer.

The B2-ordered crystalline structure of the seedlayer is most preferably NiAl. It is about 10–200 nm thick. Alternatively, the seedlayer may be FeAl or multiple layers alternating between a NiAl layer and a FeAl layer. Other phases having a B2-ordered structure and lattice constants close to that of NiAl (a=0.2887 nm), FeAl (a=0.291 nm) and Cr (a=0.2884 nm) (which is not itself a B2-ordered structure) are also considered to be good candidates, for the seedlayer of the present invention. The materials are AlCo (a=0.286 nm), FeTi (a=0.298), CoFe (a=0.285 nm), CoTi (a=0.299 nm), CoHf (a=0.316 nm), CoZr (a=0.319 nm), NiTi (a=0.301 nm), CuBe (a=0.270 nm), CuZn (a=0.295 nm), AlMn (a=0.297 nm), AlRe (a=0.288 nm), AgMg (a=0.328 nm), and $Al_2FeMn_2$ (a=0.296 nm). It is anticipated that a seedlayer comprised of two or more layers of different materials within the foregoing list may be used. For example, it is believed that a multiple layer having a first layer of NiAl and a second layer of FeAl, AlCo, FeTi, CoFe, CoTi, CoHf, CoZr, NiTi, CuBe, CuZn, AlMn, AlRe, AgMg or $Al_2FeMn_2$ may be used. Various combinations of multiple layers wherein each layer is one of the B2-ordered crystalline phases could be employed as the seedlayer of the present invention. The underlayer could also be of a composition listed above.

The subseedlayer is deposited, preferably by a physical sputtering method known in the art, on the non-magnetic substrate. Alternatively, an adhesion layer may be deposited on the substrate followed by the subseedlayer. For example, a NiAl layer deposited on a NiP-plated aluminum substrate. The subseedlayer could then be deposited on the NiAl adhesion layer. The seedlayer is then deposited on the subseedlayer.

Generally, one or more underlying layers are used between the seedlayer and the magnetic layer for longitudinal magnetic recording media. The underlying layers are chosen to obtain an underlayer exhibiting a (200)- or (112)-dominant crystallographic orientation to induce a (1120) or (1010)-dominant crystallographic orientation in the magnetic layer deposited and epitaxially grown thereon.

The subseedlayer, seedlayer and/or underlayer could be oxidized by a reactive sputtering technique in an argon-oxygen environment. Suitable oxidizing atmospheres, at a suitable temperature, e.g., about 100° C. to about 300° C., contain about 1 to about 100, preferably about 5 to about 80, volume percent of oxygen ($O_2$), the remainder being an inert gas, such as argon (Ar), in particular, about 1 to about 50 volume percent oxygen, such as about 20 percent by volume oxygen. The degree of oxidation can be such that the amount of oxygen in the top 50 Å of the oxidized layer, after in situ sputter removal of the 40 Å surface layer, is about 15 atomic percent to about 50 atomic percent, such as about 20 atomic percent to about 30 atomic percent.

In a preferred embodiment, the amount of oxygen in the argon-oxygen environment is from 1% to 80% by volume oxygen, preferably 1% to 50% by volume oxygen, more preferably 1% to 25% by volume oxygen. The amount of oxygen in the oxidized portion of the seedlayer may vary from about 0.0001 atomic percent to 20 atomic percent, preferably from about 0.001 atomic percent to 10 atomic percent, and most preferably 0.01 atomic percent to 0.9 atomic percent.

The magnetic layer is deposited with the magnetic easy axis, which would typically be the c axis in an HCP phase, of the magnetic layer substantially parallel to the plane of such magnetic layer. When multiple magnetic layers are deposited, they are each about 5–60 nm thick. Embodiments of this invention include the use of any of the various magnetic alloys containing B, Cr and Co, such as CoCrB, CoCrPtB, CoCrNiB, CoCrNiPtB, CoCrNiTaB, CoCrNiNbB, CoCrPtTaB, CoCrPtNbB and CoCrPtTaNbB, and other combinations of B, Cr, Co, Pt, Ni, Ta and Nb, in the magnetic layer.

An overlayer, which is thought to prevent corrosion, may be provided adjacent to and preferably in contact with the magnetic layer. The overlayer is 0.1–5 nm thick and may be made of W, Ta, Zr, Ti, Y, Pt, Cr or any combination thereof.

An overcoat may be provided external to the overlayer, so that the overlayer is positioned between the magnetic layer and the overcoat. The overcoat provides a mechanical wear layer and is typically 2.5–30 nm thick. It is preferably made of a ceramic material or diamond-like carbon, such as $SiO_2$, SiC, CN, $ZrO_2$ or C. An organic lubricant may be disposed on the overcoat. The lubricant is generally 1 nm to 30 nm thick and is preferably a fluoro-chlorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

The substrates that may be used in the invention include glass, glass-ceramic, NiP/aluminum, metal alloys, plastic/polymer material, ceramic, glass-polymer, composite materials or other non-magnetic materials.

The Cr-alloy underlayer may form a (112) surface orientation when deposited on a B2 structured seedlayer such as NiAl. Then, a magnetic layer having a substantially (1010) crystallographic orientation is deposited on the Cr-alloy underlayer.

Desirably, the lattice constant and the crystal plane of the seedlayer closely matches that of the Cr-alloy underlayer. As a consequence of lattice and crystalline plane matching, the magnetic layer will grow in a close-packed hexagonal structure with a (1010) crystallographic orientation predominantly parallel to the film plane. As a result, the subsequently deposited magnetic layer exhibits a close-packed hexagonal structure with the magnetic easy axis, c-axis, lying predominantly in the film plane.

In one embodiment, the structure of the recording medium is the following: a glass or glass-ceramic substrate, W, $NbW_{40}$ or $TaW_{25}$ seedlayer on the substrate, an oxidized NiAl seedlayer, a $CrRu_{10}W_5$ underlayer on the seedlayer, a $CoCr_{18}Pt_{9.5}B_6$ magnetic layer on the underlayer and a protective overcoat on the magnetic layer.

In the preferred embodiment, a CoCr or CoCr-alloy intermediate layer is deposited on the underlayer. Preferably, the structure of the intermediate layer is HCP. The CoCr-alloy could further contain Mo, Ta, Pt, Ru, Ti, B and Ni in the range of about 0 to about 40 atomic percent, more preferably, about 0.1 to about 7 atomic percent.

The formation of a magnetic layer exhibiting substantial two-dimensional directional magnetic isotropy is advantageous in many respects. For example, a magnetic recording medium comprising a magnetic layer characterized by substantial directional magnetic isotropy exhibits significantly improved overwrite characteristics and significantly reduced magnetic property modulation, particularly reduced $H_c$ modulation in the circumferential direction. In addition, directional magnetic isotropy could decrease nonlinear noise behavior at high recording densities.

In a preferred embodiment, the thickness of the subseedlayer is about 10 Å to about 500 Å, preferably between about 20–250 Å, and most preferably about 25–40 Å.

The thickness of the B2 structure seedlayer is 200 Å to about 1600 Å, preferably between 300 Å and 1200 Å, and most preferably about 600 Å. The thickness of the underlayer is 12 Å to about 500 Å, preferably between 15 Å and 250 Å, and most preferably about 25 Å. The thickness of the magnetic layer is 50 Å to about 300 Å, preferably between 100 Å and 225 Å, and most preferably about 150–200 Å. The thickness of the protective layer is 20 Å to about 300 Å, preferably between 30 Å and 100 Å, and most preferably about 50 Å. The protective layer is made of hydrogenated carbon ($CH_x$).

The magnetic recording medium has a remanent coercivity of about 2000 to about 10,000 Oersted, and an Mrt (product of remanance, Mr, and magnetic layer thickness, t) of about 0.2 to about 2.0 memu/$cm^2$. In a preferred embodiment, the coercivity is about 2500 to about 9000 Oersted, more preferably in the range of about 3000 to about 6000 Oersted, and most preferably in the range of about 3350 to about 5000 Oersted. In a preferred embodiment, the Mrt is about 0.25 to about 1 memu/cm$^2$, more preferably in the range of about 0.3 to about 0.7 memu/cm$^2$, and most preferably in the range of about 0.3 to about 0.6 memu/cm$^2$.

EXAMPLES

All samples described in this disclosure were fabricated with DC magnetron sputtering. Even the carbon films were made with DC magnetron sputtering. SMNR was measured using a Guzik 1701 MP spinstand. It analyzes the noise spectrum from the output of any read head you attach to it. The background noise and dc-noise were subtracted to leave only the noise coming from the media itself.

As explained above, subseedlayer is the layer sputtered immediately above the substrate. This layer alters the structure of the surface upon which the seedlayer is deposited. Hence, the subseedlayer can significantly affect the structure features, such as the distribution of grain size, grain shape and crystallographic texture, of the later deposited layers. Small grain size and a high degree of in-plane c-axis texture of the magnetic layer are beneficial to the recording properties of the longitudinal magnetic recording medium. The examples below illustrate the effect of the use of a subseedlayer in a recording medium.

Applicants employed subseedlayers of W-alloys. Tungsten alloys, which can be sputtered to form films containing an amorphous material, nanocrystalline material and mixtures thereof, were chosen. Nanocrystalline material means fine crystals of less than 5 nm and could preferably be fine crystals of less than 2.5 nm. Such a subseedlayer is less likely to adversely affect the crystallographic texture of the seedlayer, such as the (112) laminar texture in NiAl and the (002) laminar texture in Cr or Cr alloys. W-Ta (with 70 to 85 at % Ta) and W-Nb (with 50 to 80 at % Nb) were easy to be deposited as films and these films also have very good corrosion resistance as reported by J. Bhattarai et al. in *Corrosion Science*, Vol. 40, No. 4/5, pp. 757–779, 1998, and *Corrosion Science*, Vol. 40, No. 1, pp. 19–42, 1998.

Applicants found that subseedlayers of TaW and NbW can also significantly increase coercivity and SMNR of the media. The subseedlayer could be very thin (~20 Å) and still effective. Heater power could be reduced by about 50% without decreasing medium coercivity.

Film structures studies primarily had the followings structures:

$1_{st}$ layer (subseedlayer): W, NbW$_{40}$ or TaW$_{25}$
$2^{nd}$ layer (seedlayer): NiAl sputtered with Ar+O
$3^{rd}$ layer (underlayer): CrRu$_{10}$W$_5$
$4^{th}$ layer (magnetic layer): CoCr$_{18}$Pt$_{9.5}$B$_6$
$5^{th}$ layer: carbon overcoat.

The $1^{st}$, $2^{nd}$ and/or $3^{rd}$ layers were also sputtered with Ar+O gas to decrease grain size.

In the preparation of the films with a controllable amount of incorporated oxide, it is possible to either controllably dope the target or to reactively sputter in a halogen-oxygen environment. Doping the target offers the advantage of having less detrimental oxygen free in the sputter chamber, while reactive sputtering offers better control of oxidation level. To utilize oxygen-doped targets, select an oxygen level between 0.01 and 0.9 atomic percent. Beyond this range, it might be intractable to maintain crystallographic integrity as the oxide component of the film may exceed the metallically bonded volume. To utilize reactive sputtering, the flow ratio should be set between Ar and O$_2$ such that oxygen makes up between 1% and 5% of the gas volume (pressure). The precise amount of incorporated oxygen is to be experimentally determined according to the alloy additions chosen; for more stable oxide-forming alloys, less oxygen would be needed in processing.

The details of the process of this invention are the following.

Procure NiP-coated substrates and clean them using a conventional cleaning/polishing processing available at any media production facility, which are described below. Load the substrates into a vacuum processing system capable of multilayer sputter processing. This system must include heating, sputtering (dc or rf magnetron), cooling, and carbon overcoat sputtering capability.

The process phases would proceed as follows:
(1) Apply a 0–100 Å thick subseedlayer with or without oxidation at a deposition rate of ~50 Å/s while maintaining a substrate bias of zero Volts and an overall Ar+O pressure of 5 mTorr if oxidation is required.
(2) Heat substrate to approximately 280° C. in a vacuum ambient (<1 ×10$^{-6}$ Torr). The low metallic-like emissivity of the NiP surface (as well as for the sputtered layers) allows on time heating at the front end of the vacuum process.
(3) Apply a 200–700 Å thick NiAl layer with our without oxidation under conditions similar to those for depositing the subseedlayer.
(4) Apply 50–250 Å underlayer of CrRuW via sputtering at a deposition rate of ~25 Å/s while maintaining −100 Volts substrate bias and an argon pressure of 5 mTorr.
(5) Optionally, apply an intermediate layer composed of identical portions of the magnetic layer alloy additions with sufficiently more Cr so as to render the material non-magnetic (>30 atomic percent) to a thickness of 35 Å using a deposition rate of 25 Å/s while maintaining a substrate bias of −450 Volts and an argon pressure of 5 mTorr. This layer will allow the bcc-hcp transition to occur without sacrifice of anisotropy in the magnetic layer.
(6) Apply sufficient thickness of a CoCrPtB magnetic layer at a deposition rate of about 50 Å/s and a substrate bias of −250 Volts and an argon pressure of 8 mTorr.
(7) Cool substrate below 150° C. in a helium ambient of 10 T.
(8) Apply a 50 Å overcoat at a deposition rate of −100 Å/s wherein the substrate is resistively connected to ground through a 100 MΩ resistor.

Optionally, the order of step (1) and step (2) could be interchanged.

Once this vacuum process is completed, apply a 20 Å Z-Tetrol lubricant to the finished surface, then buff, wipe, and burnish the media. If done correctly, the media should pass 0.35 micro-inch ($\mu$in) glide testing and can be evaluated using a Guzik spinstand parametric tester.

The cleaning/polishing methods and the cleaning/polishing means that can employed are any one or more of the methods shown below.

Mechanical Polishing

Persons skilled in this art would recognize that the variables that control mechanical polishing are:
(1) substrate surface initial condition: roughness, waviness, substrate size, substrate shape and grain size;
(2) polishing slurry size (Al$_2$O$_3$, CeO$_2$, SiO$_2$, etc) and coolant (inorganic and organic solutions with lubricant);

(3) polishing time and surface finishing; and
(4) washing and cleaning substrate surface.

Chemical Polishing

Persons skilled in this art would recognize that the variables that control chemical polishing are:
(1) substrate surface initial condition: roughness, waviness, substrate size, substrate shape and grain size;
(2) polishing solutions compositions and their ability to dissolve the substrate materials;
(3) the composition consists of a combination of different acids (e.g. nitric, sulfuric, hydrochloric, phosphoric, chromic, acetic) or organic solutions (e.g. methanol, glycerin, ethyldiglicol), also containing some added electropositive ions. For example, during polishing of Al small amounts of Cu will create additional local cathodes by deposition on Al and stimulate the polishing process. Adding some oxidants has a function of depolarization agents.

Electrochemical Polishing

Persons skilled in this art would recognize that the variables that control electrochemical polishing are:
(1) The external source of electricity to produce the anodic current density and voltage;
(2) the electrolyte temperature;
(3) the time duration of electropolishing;
(4) the cathodic materials; in general, the cathode surface should be many times larger than that of electropolished substrate. Different materials are used as cathodes depending on the applied electrolyte; and
(5) agitation, which can eliminate the undesired concentration of the dissolved material at the substrate. Agitation can improve the supply of fresh electropolishing electrolyte to substrate surface. Agitation can prevent local heating and release gas bubbles from the polished surface to avoid pitting on the substrate surface CMP (Chemical Mechanical Polishing) used in semiconductor wafer polishing. Persons skilled in this art would recognize the variables that control the CMP process.

The results of various embodiments of this invention are shown in FIGS. 4–11.

Figure 4:
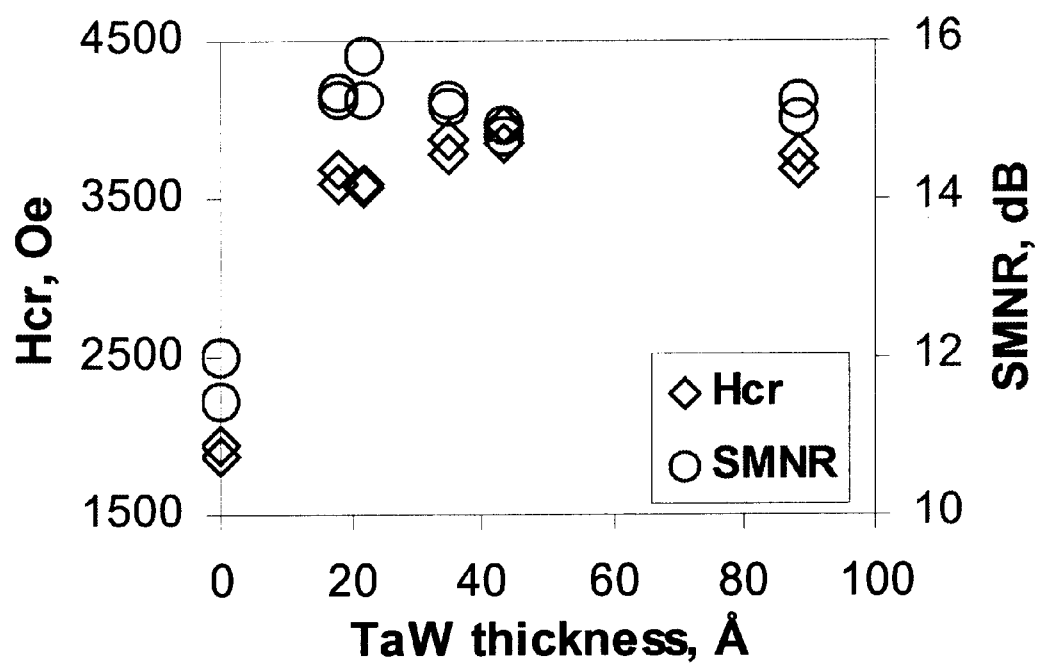
FIG. 4 shows the coercivities and SMNR of NiAlOx\CrRuW\CoCrPtB films with various thicknesses of TaW subseedlayers on glass substrates.

FIG. 4 shows the coercivities and SMNR of NiAlOx\CrRuW\CoCrPtB films with various thickness of TaW subseedlayers on glass substrates. FIG. 4 shows that Hcr and SMNR increase from about 1,700 and 11 to about 3,500 and 15, respectively, when only a 20 Å a subseedlayer of TaW is deposited between a glass substrate and an NiAl seedlayer.

Figure 5:
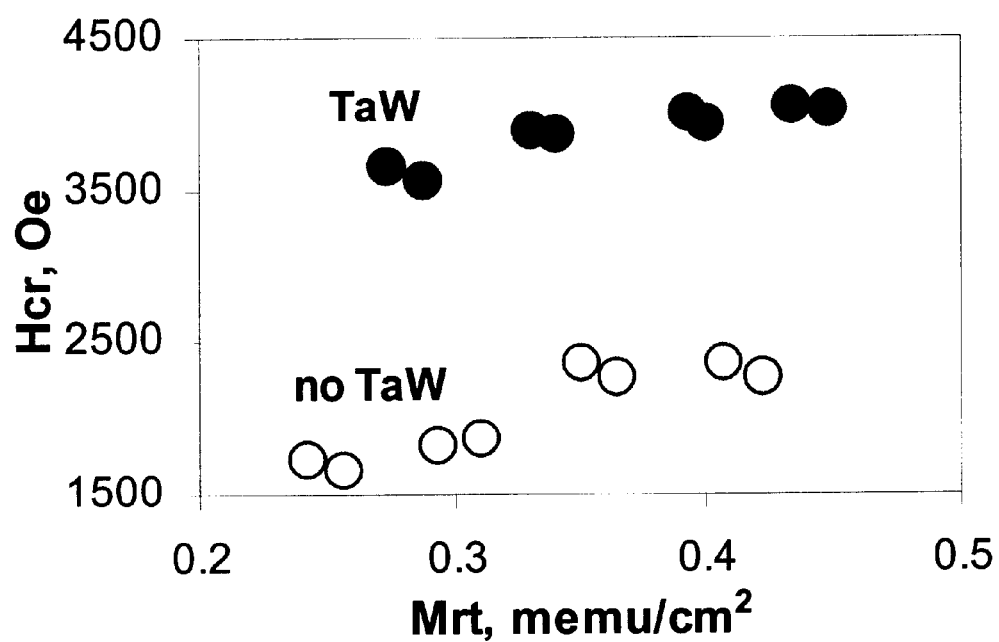
FIG. 5 shows coercivities of NiAlOx\CrRuW\CoCrPtB films of various magnetic layer thicknesses with and without 26 Å TaW subseedlayers on glass substrates.

FIG. 5 shows coercivities of NiAlOx\CrRuW\CoCrPtB films of various magnetic layer thicknesses with and without 26 Å TaW subseedlayers on glass substrates. FIG. 5 shows that the coercivities increase from 1,500–2,500 to 3,500–4,500 Oe by the use of TaW subseedlayers.

Figure 6:
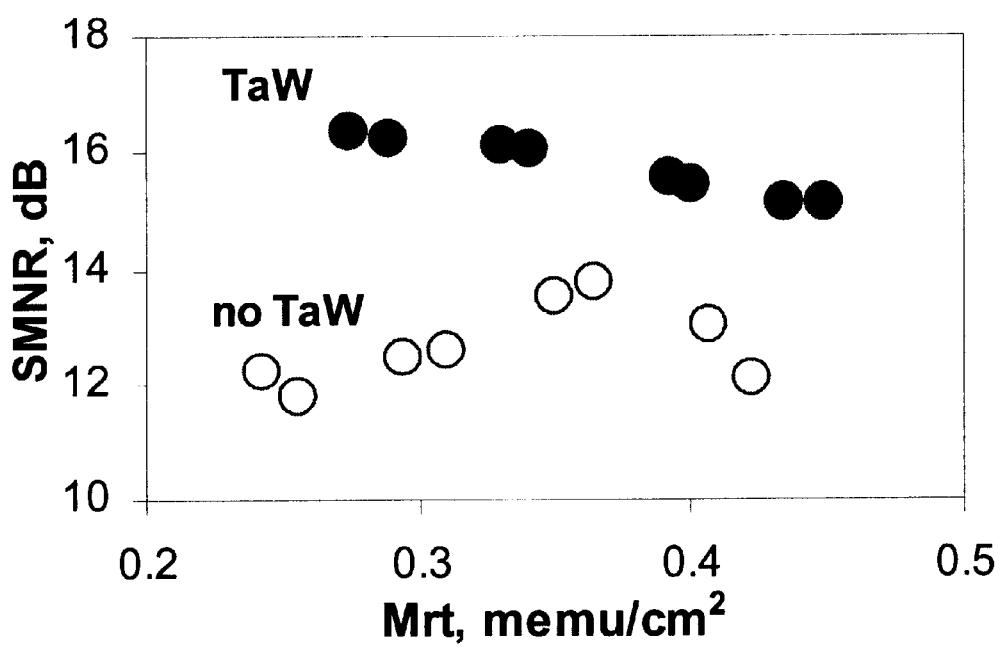
FIG. 6 shows SMNR of NiAlOx\CrRuW\CoCrPtB films of various magnetic layer thicknesses with and without 26 Å TaW subseedlayers on glass sub strates.

FIG. 6 shows SMNR of NiAlOx\CrRuW\CoCrPtB films of various magnetic layer thicknesses with and without 26 Å TaW subseedlayers on glass substrates. FIG. 6 shows that SMNR increases from 12–14 to 15–17 dB by the use of the TaW subseedlayer.

Figure 7:
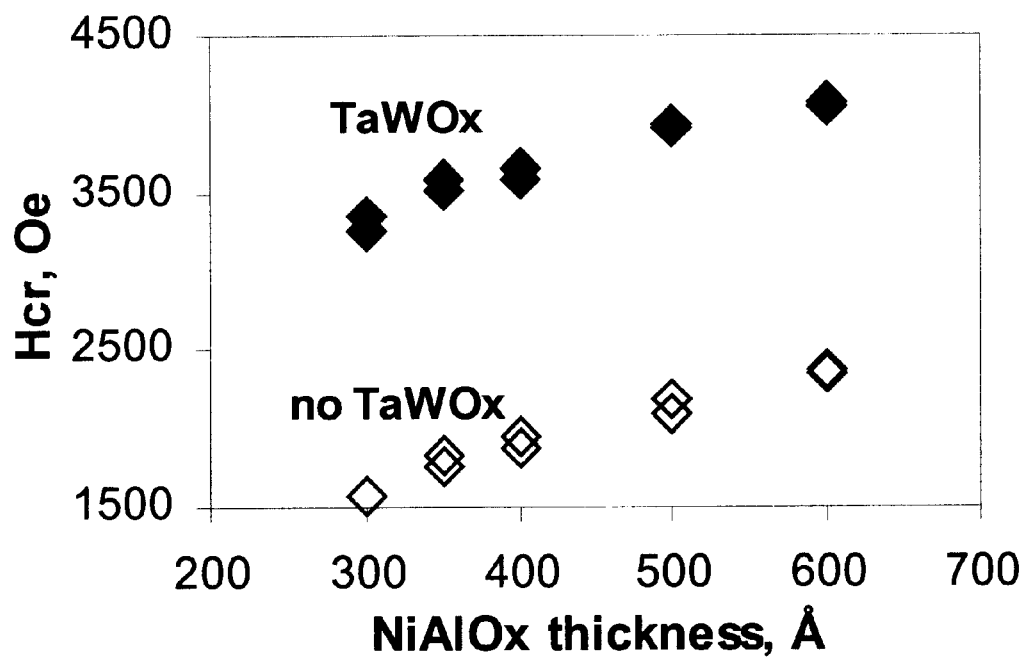
FIG. 7 shows coercivities of NiAlOx\CrRuW\CoCrPtB films of various NiAlOx layer thicknesses with and without 26 Å TaWOx subseedlayers on glass substrates.

FIG. 7 shows coercivities of NiAlOx\CrRuW\CoCrPtB films of various, NiAlOx layer thicknesses with and without 26 Å TaWOx subseedlayers on glass substrates. FIG. 7 shows that the coercivities increase from 1,500–2,500 to 3,500–4,500 Oe by the use of TaW subseedlayers.

Figure 8:
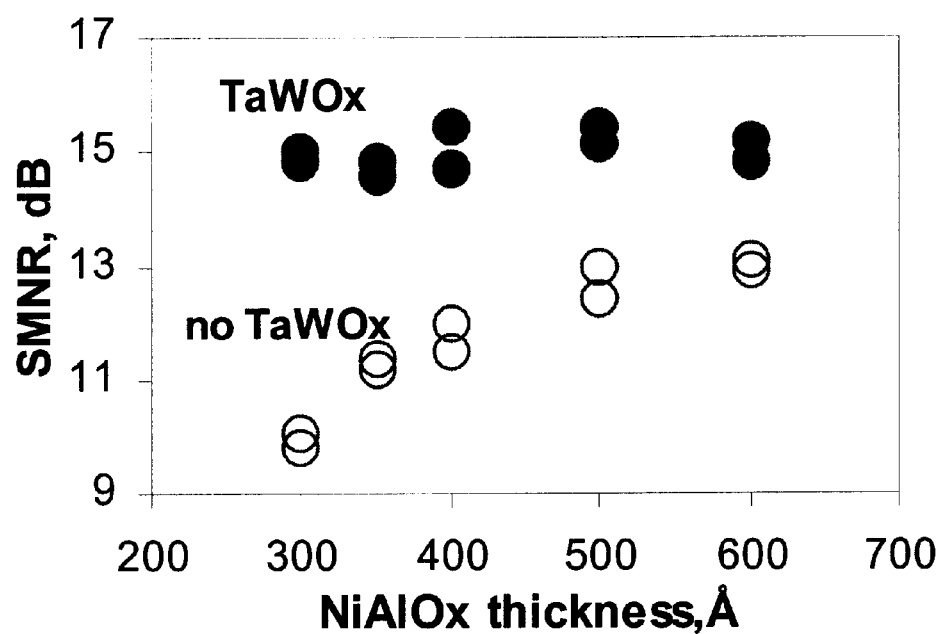
FIG. 8 shows SNMR of NiAlOx\CrRuW\CoCrPtB films of various NiAlOx layer thicknesses with and without 26 Å TaWOx subseedlayers on glass substrates.

FIG. 8 shows SNMR of NiAlOx\CrRuW\CoCrPtB films of various NiAlOx layer thicknesses with and without 26 Å TaWOx subseedlayers on glass substrates. FIG. 8 shows that SMNR increases from 12–14 to 15–17 dB by the use of the TaW subseedlayer.

Figure 9:
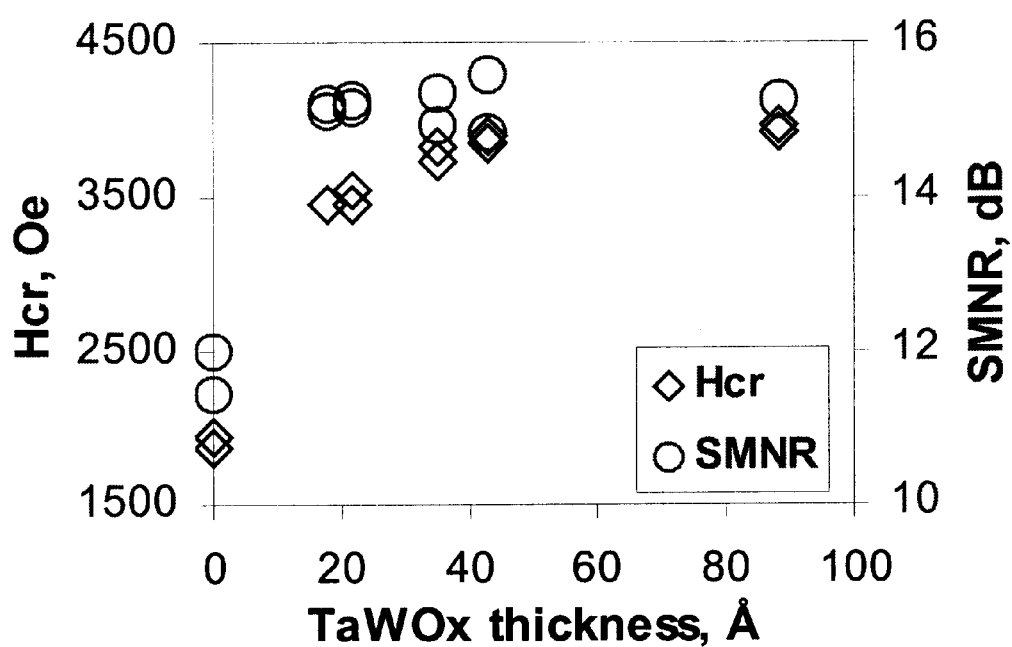
FIG. 9 shows SMNR and coercivities of NiAlOx\CrRuW\CoCrPtB films of various TaWOx layer thicknesses on glass substrates.

FIG. 9 shows SMNR and coercivities of NiAlOx\CrRuW\CoCrPtB films of various TaWOx layer thicknesses on glass substrates.

Figure 10:
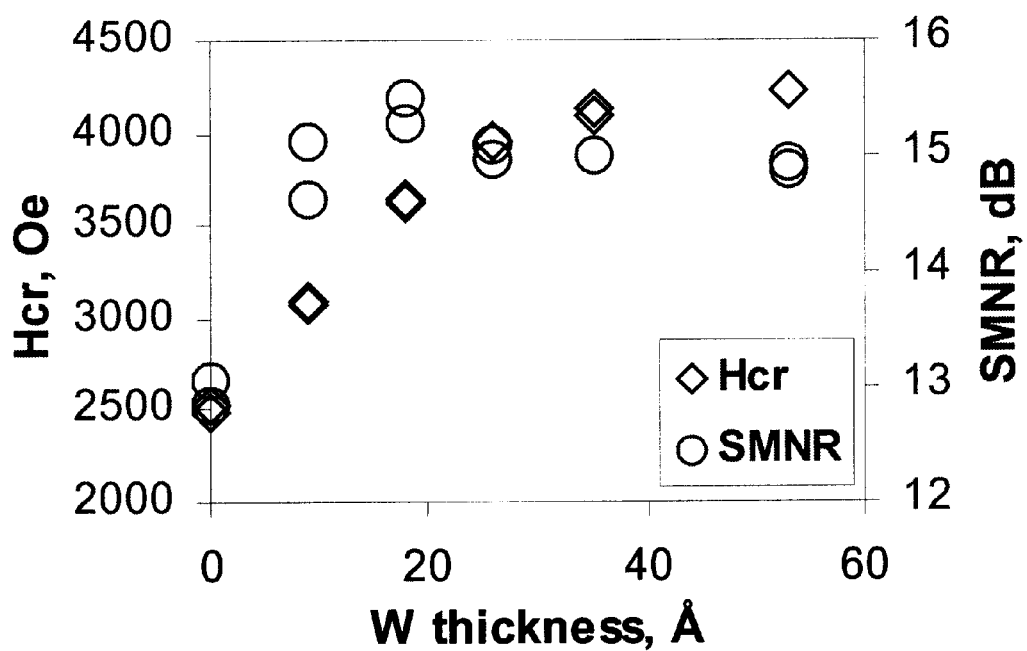
FIG. 10 shows SMNR and coercivities of NiAlOx\CrRuW\CoCrPtB films with various thicknesses of W subseedlayers on glass substrates.

FIG. 10 shows SMNR and coercivities of NiAlOx\CrRuW\CoCrPtB films with various thicknesses of W subseedlayers on glass substrates.

Figure 11:
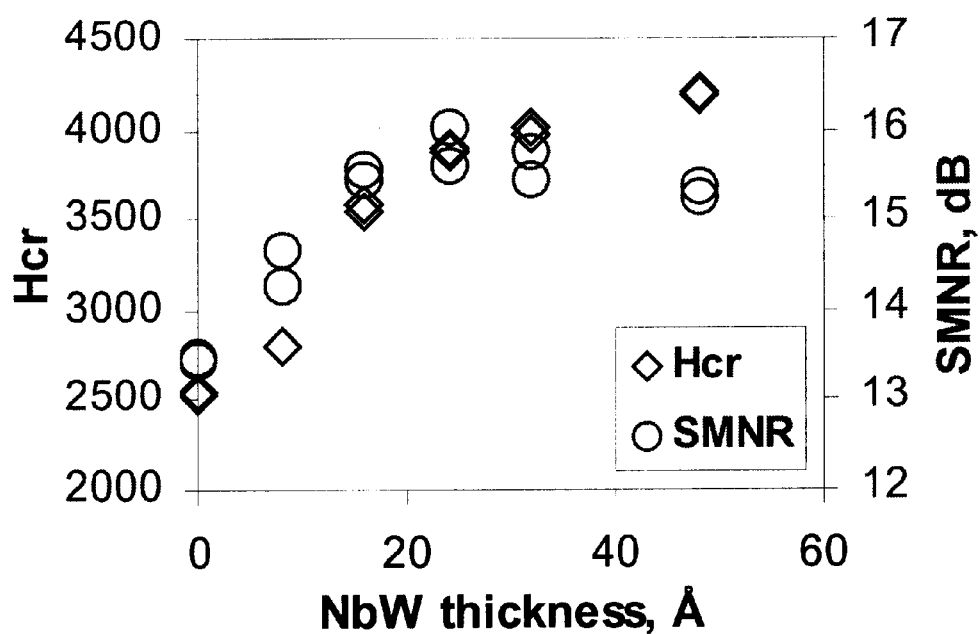
FIG. 11 shows SMNR and coercivities of NiAlOx\CrRuW\CoCrPtB films with various thicknesses of NbW subseedlayers on glass substrates.

FIG. 11 shows SMNR and coercivities of NiAlOx\CrRuW\CoCrPtB films with various thicknesses of NbW subseedlayers on glass substrates.

The above examples show that W–X alloy, where X is Ta and/or Nb subseedlayers improves coercivity and SMNR of magnetic recording medium. Less than 100 Å of the subseedlayer is sufficient to be effective. A useful range for Ta is 70 to 85 at % and for Nb 50 to 80 at %. Ternary W–X–Y alloy may also be used, where X and Y could be two different Group Vb elements.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporayed herein by reference.

What is claimed is:

1. A magnetic recording medium, comprising:
  a substrate,
  a subseedlayer comprises a composition comprising a Group VIb element,
  a seedlayer comprising a material comprising a B2 structure, and
  a magnetic layer, in this order,
  wherein the magnetic recording medium has a coercivity in a range of about 3,350 Oe to about 6,000 Oe and the subseedlayer promotes the coercivity from below said range to said range by the presence of the subseedlayer between the substrate and the seedlayer.

2. The magnetic recording medium of claim 1, wherein the subseedlayer further comprises a Group Vb element.

3. The magnetic recording medium of claim 1, wherein the seedlayer further comprises a (112) laminar texture.

4. The magnetic recording medium of claim 1, wherein a portion of the seedlayer is oxidized.

5. The magnetic recording medium of claim 1, further comprising an underlayer comprising a Cr-containing material.

6. The magnetic recording medium of claim 4, wherein the oxidized portion of the seedlayer contains from about 0.0001 atomic percent oxygen to about 20 atomic percent oxygen.

7. The magnetic recording medium of claim 1, the subseedlayer is amorphous.

8. The magnetic recording medium of claim 5, further comprising an intermediate layer interposed between the magnetic layer and the underlayer.

9. The magnetic recording medium of claim 1, wherein the subseedlayer is between about 1 nm to 50 nm thick.

10. The magnetic recording medium of claim 1, wherein the subseedlayer comprises Ta and W or Nb and W and the seedlayer comprises Ni and Al.

11. A method of manufacturing a magnetic recording medium, comprising:

depositing a subseedlayer on a substrate;

depositing a seedlayer on the subseedlayer and depositing a magnetic layer on the seedlayer, wherein the subseedlayer comprises a composition comprising a Group VIb element and the seedlayer comprises a material comprising a B2 structure, and wherein the magnetic recording medium has a coercivity in a range of about 3,350 Oe to about 6,000 Oe and the subseedlayer promotes the coercivity from below said range to said range by the presence of the subseedlayer between the substrate and the seedlayer.

12. The method of manufacturing a magnetic recording medium of claim 11, wherein the subseedlayer further comprises a Group Vb element.

13. The method of manufacturing a magnetic recording medium of claim 11, wherein the seedlayer further comprises a (112) laminar texture.

14. The method of manufacturing a magnetic recording medium of claim 11, further comprising oxidizing a portion of the seedlayer to form an oxidized portion.

15. The method of manufacturing a magnetic recording medium of claim 11, further comprising depositing an underlayer comprising a Cr-containing material on the seedlayer.

16. The method of manufacturing a magnetic recording medium of claim 14, wherein the oxidized portion of the seedlayer contains from about 0.01 atomic percent oxygen to about 0.9 atomic percent oxygen.

17. The method of manufacturing a magnetic recording medium of claim 14, wherein the oxidized portion of the seedlayer has a mean grain size diameter of 10 nm or less.

18. The method of manufacturing a magnetic recording medium of claim 11, wherein the subseedlayer is between about 0.1–50 nm thick.

19. The method of manufacturing a magnetic recording medium of claim 11, wherein the subseedlayer comprises Ta and W or Nb and W and the seedlayer comprises Ni and Al.

20. A magnetic recording medium, comprising:

a seedlayer comprising a material comprising a B2 structure, and subseed layer for improving a (112) laminar texture of the seedlayer, and a magnetic layer, wherein the magnetic recording medium has a coercivity in a range of about 3,350 Oe to about 6,000 Oe and the subseedlayer promotes the coercivity from below said range to said range by the presence of the subseedlayer between the substrate and the seedlayer.

21. The magnetic recording medium of claim 1, wherein the composition is selected from the group consisting of TaW, TaWOx, Nb and W.

22. The magnetic recording medium of claim 21, wherein the seedlayer is NiAl or oxidized NiAl.

23. The magnetic recording medium of claim 22, wherein the magnetic layer is CoCrPtB.

24. The method of claim 11, wherein the composition is selected from the group consisting of TaW, TaWOx, Nb and W.

25. The method of claim 24, wherein the seedlayer is NiAl or oxidized NiAl.

26. The method of claim 25, wherein the magnetic layer is CoCrPtB.

27. The magnetic recording medium of claim 20, wherein the composition is selected from the group consisting of TaW, TaWOx, Nb and W.

28. The magnetic recording medium of claim 27, wherein the seedlayer is NiAl or oxidized NiAl.

29. The magnetic recording medium of claim 28, wherein the magnetic layer is CoCrPtB.

* * * * *